July 28, 1959
L. T. STAFFORD ET AL
2,896,311
METHOD AND APPARATUS FOR ALIGNING SLOTTED LAMINATIONS
Filed Dec. 2, 1954
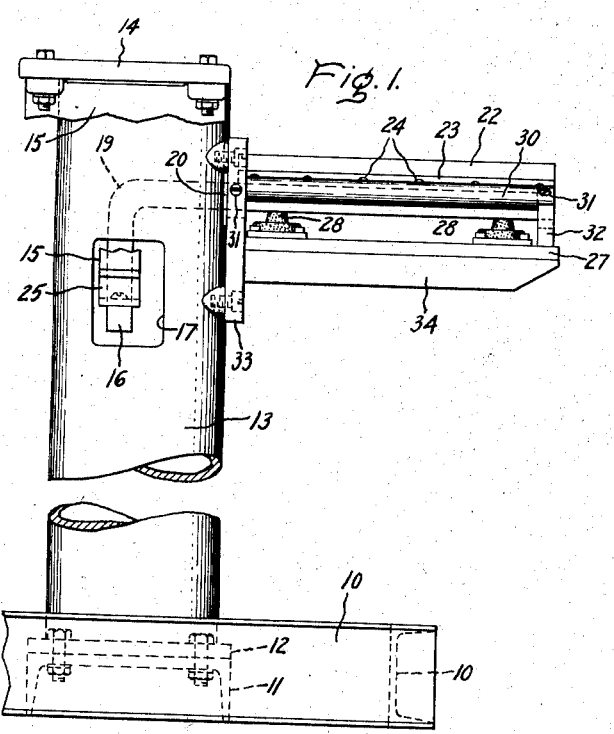
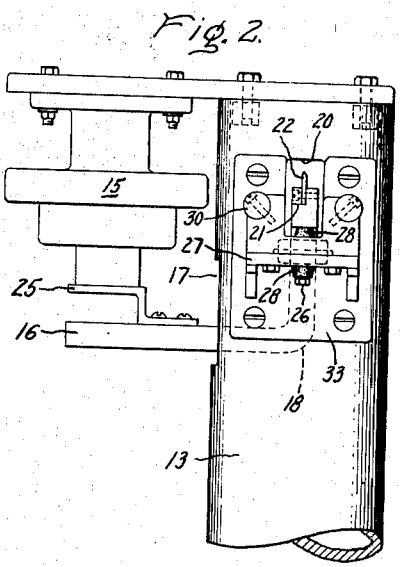
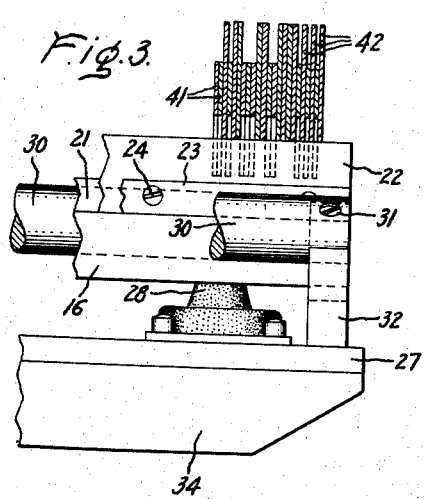
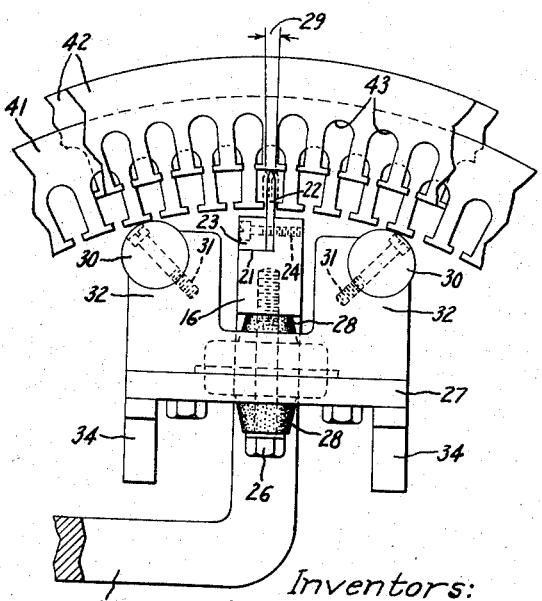
Inventors:
Linn T. Stafford,
William F. Bernadt,
by
Their Attorney.

United States Patent Office 2,896,311
Patented July 28, 1959

2,896,311

METHOD AND APPARATUS FOR ALIGNING SLOTTED LAMINATIONS

Linn T. Stafford, Scotia, and William F. Bernadt, Schenectady, N.Y., assignors to General Electric Company, a corporation of New York Application December 2, 1954, Serial No. 472,626

3 Claims. (Cl. 29—155.61)

Our invention relates to a method of and apparatus for aligning slotted laminations and has particular significance in connection with means for aligning annular stator laminations having winding slots for use in dynamoelectric machines.

Heretofore there has been a problem in connection with the aligning of stator laminations which results because the slotted magnetic punchings are discharged from a punch press in a random manner so far as slot alignment is concerned. The assembling of the slotted laminations for the stator core has consisted in stacking the laminations within a shell by hand while using one or more guide rods to engage certain of the slots to orient the slots into alignment so that the slots are arranged to receive a stator winding. This is a time consuming method and involves the use of expensive hand labor.

It is an object of the present invention to provide simple and inexpensive means for overcoming the above-mentioned difficulties.

Another object of the invention is to provide a method of aligning slotted laminations in greatly reduced time.

A further object of the invention is to provide apparatus which will automatically align the slots of slotted punchings of magnetic material.

Briefly stated, the means employed in the embodiment herein described comprise the use of a knife edge arranged on a fixture designed to receive a pre-selected number of slotted punchings having slots in random alignment. By imparting a vibratory movement to the knife edge, the friction between the surface of each lamination between adjacent slots and the knife edge together with the inertia of the lamination cause the lamination to rotate until a slot thereof straddles the knife edge. The knife edge is narrower than the slot opening, and for nearly perfect alignment it vibrates through a dimension substantially equal to the narrowest part of the slot which it touches at its limits of travel. Thus a vibratory force is used to align punching slots in a rapid manner and with the arrangement it is possible to align a large stack of laminations in a few seconds.

Other objects and advantages will become apparent and the invention will be better understood from consideration of the following description taken in connection with the accompanying drawings in which:

Fig. 1 is a side elevational view, partly broken away, of apparatus useful in carrying out the invention;

Fig. 2 is a partial front view of the apparatus shown in Fig. 1;

Fig. 3 is an enlarged view of a portion of the apparatus as seen in Fig. 1 and shown as during operation; and Fig. 4 is an enlarged front view of a portion of the apparatus as shown in Fig. 3.

Referring now to the drawing, the machine shown comprises a square base member formed of channels 10 supporting a central channel 11 in turn supporting a flange 12 provided at the base of a central pipe 13. Pipe 13 is of substantial dimensions, for example, about 43" long, with an outer diameter of 6½" and having a wall thickness of ½". Central pipe 13 supports a radially extending plate 14 which in turn supports an electrically operated vibrator indicated generally at 15 (Fig. 2) and which is a standard item of commerce and therefore need not be further described. Such a vibrator may be electromagnetically operated and spring loaded although such an arrangement is not essential to performance of the present invention and the necessary vibration could be imparted instead by the use of a motor driven crank, or by the use of motor which has been mechanically unbalanced sufficiently to provide vibration of desired amplitude, but however produced it is assumed that vibration causes the left end of arm 16 (as seen in Fig. 2) to oscillate vertically. Arm 16 enters into the center of the pipe 13 through an aperture 17 provided in a wall of the pipe and of sufficient size so that there will be no interference between arm 16 and the edges of this opening. Towards the center of the pipe, arm 16 turns upwardly at 18 and then at a 90° angle turns radially outward at 19 to extend radially out of the pipe through another clearance aperture 20. Outside of the pipe the top portion of this arm 16 is notched at 21 to provide a seat for a knife edge 22 held upon the notched portion of the arm by a retaining bar 23 and a plurality of screws 24.

Preferably, the connection between the vibrator and the arm 16 may be through spring means such as a stepped member 25 of spring temper steel, while at its other end the arm 16 below notch 21 is held by bolts 26 held to a stationary member 27 through resilient rubber mounts 28 so that the back and forth movement on the vibrator end of arm 16 tends to end up in an arc 29 with the mounts 28 serving to provide pivot points. As best shown in Fig. 4, a pair of rods 30 fastened respectively by screws 31 to raised portions 32 of support member 27 are provided to support the weight of each lamination after its winding slot straddles knife 22 to reduce the loading on knife 22. The back plate 33 is bolted to the central pipe 13 as shown in Figs. 1 and 2, and provides support for a pair of gussets 34 and the transverse horizontal member 27 which in turn supports raised portions 32.

In operation, a predetermined group of slotted punchings with their axis horizontal are placed over the knife edge 22. Immediately some of the punchings (41 in Figs. 3 and 4) will fall so that one slot of each straddles the knife edge and so that their inner diameter rests upon the rods 30, while others of the punchings 42 remain elevated with a slot tooth between adjacent slots 43 resting upon the knife edge 22. When power is applied to the vibrator and a vibratory motion is applied through arm 16 to the knife edge which has preferably a limit of vibratory motion of slightly less than the slot width so that the knife edge vibrates freely to the walls of the slot after the lamination has been rotated to its aligned position, the inertia of the raised annular punchings and the friction between the inner peripheral surface of each raised punching and the knife edge causes each punching to rotate until it has a slot straddling the knife 22 at which time the punching drops upon the rods 30. The punchings may rotate in either direction depending upon the slight variations in the frictional forces encountered between the knife edge and the cooperating surface of the punching and upon the initial direction of the vibratory movement of the knife 22. Upon dropping upon the rods 30, each lamination 42 continues to be rotated by the knife 22 until it is exactly centered upon the knife. At this position the knife 22, at most, barely contacts the walls of the slot and consequently vibrates free from any force imparted to knife 22 by the aligned laminations 41. Thus the winding slots in all the punchings or laminations in the group are aligned, actually in the manner of just a few seconds.

There is thus provided apparatus and method of the character described and capable of meeting the objects above set forth.

While we have illustrated and described a particular embodiment of our invention, various modifications will be apparent to those skilled in the art. We desire it to be understood, therefore, that our invention is not to be limited to the particular arrangement disclosed, and we intend in the appended claims to cover all modifications which do not depart from the true spirit and scope of the invention.

What we claim as new and desire to secure by Letters Patent of the United States is:

1. The method of aligning dynamoelectric machine annular stator punchings having like inner periphery winding slots, comprising the steps of placing a group of punchings having slots distributed at random over a knife engageable into any one of the slots, supporting independently of the knife edge all punchings of the group having a slot straddling the knife edge, and applying a vibratory force to cause the knife edge to vibrate through an arc with a maximum amplitude of vibration equal to the smallest width of the like slots adjacent the knife edge to rotate each punching of the group until each has a slot straddling said knife edge.

2. Apparatus for aligning electrical sheet laminations comprising annular rings having winding slots on their inner peripheries, said apparatus comprising a vertical support member, a stationary horizontal member extending horizontally from said vertical member, rubber mounting means associated with said horizontal member, a horizontal knife edge supported by said rubber mounting means for vibratory movement through a restricted arc, and a vibrator for imparting vibratory movement to said knife edge.

3. The method of aligning annular laminations having a plurality of conductor slots on the inner periphery thereof, comprising the steps of placing a predetermined number of said laminations having their conductor slots distributed at random over a knife edge of less thickness than the openings of said slots to be supported thereby, and applying a rotary vibratory force to the knife edge to cause the knife edge to vibrate through a small arc until a slot in each of said laminations straddles the knife edge.

References Cited in the file of this patent

UNITED STATES PATENTS

| | | |
|---|---|---|
| 1,892,502 | Burd | Dec. 27, 1932 |
| 2,157,709 | Kiessling | May 9, 1939 |
| 2,293,843 | Marvin | Aug. 25, 1942 |
| 2,673,391 | Goodwin | Mar. 30, 1954 |